United States Patent
Doebrich et al.

(10) Patent No.: US 9,645,564 B2
(45) Date of Patent: May 9, 2017

(54) METHOD FOR OPERATING A MODULAR AUTOMATION DEVICE

(75) Inventors: Udo Doebrich, Karlsbad (DE); Roland Heidel, Kandel (DE)

(73) Assignee: Siemens Aktiengesellschaft, Munich (DE)

( * ) Notice: Subject to any disclaimer, the term of this patent is extended or adjusted under 35 U.S.C. 154(b) by 889 days.

(21) Appl. No.: 12/996,355

(22) PCT Filed: Jun. 5, 2008

(86) PCT No.: PCT/EP2008/004503
§ 371 (c)(1),
(2), (4) Date: Jan. 26, 2011

(87) PCT Pub. No.: WO2009/146723
PCT Pub. Date: Dec. 10, 2009

(65) Prior Publication Data
US 2011/0125343 A1  May 26, 2011

(51) Int. Cl.
G05B 11/01 (2006.01)
G05B 19/042 (2006.01)
H02J 1/14 (2006.01)

(52) U.S. Cl.
CPC ............. *G05B 19/042* (2013.01); *H02J 1/14* (2013.01); *G05B 2219/25387* (2013.01)

(58) Field of Classification Search
CPC ............ G06F 1/26; G05B 19/042; G05B 2219/25387; H02J 1/14
USPC .................................. 713/330, 340; 700/22
See application file for complete search history.

(56) References Cited

U.S. PATENT DOCUMENTS

| | | | | |
|---|---|---|---|---|
| 6,134,666 A * | 10/2000 | De Nicolo | ............ | 713/300 |
| 6,925,363 B2 * | 8/2005 | Hutton | ............ | 700/295 |
| 7,657,762 B2 * | 2/2010 | Orr | ............ | 713/300 |
| 2002/0072868 A1 * | 6/2002 | Bartone et al. | ............ | 702/62 |
| 2004/0230533 A1 * | 11/2004 | Benco | ............ | 705/63 |
| 2005/0174225 A1 * | 8/2005 | Kuchler | ............ | 340/445 |
| 2006/0116102 A1 * | 6/2006 | Brown et al. | ............ | 455/343.1 |
| 2009/0129032 A1 | 5/2009 | Liedtke et al. | | |

FOREIGN PATENT DOCUMENTS

| | | |
|---|---|---|
| DE | 10 2005 039 886 | 3/2007 |
| WO | WO 2004/023624 | 3/2004 |
| WO | WO 2007/037609 | 4/2007 |

OTHER PUBLICATIONS

Nicholson, K. et al., "Cost effective strategies for industrial electric power management systems", Petroleum and Chemical Industry Conference, 1998. Industry Application S. Society 45th Annual Indianapolis, USA, Sep. 28-30, 1988, New York, pp. 223-233, XP010312461.

(Continued)

*Primary Examiner* — Ziaul Karim
(74) *Attorney, Agent, or Firm* — Cozen O'Connor

(57) ABSTRACT

A method for operating an automation system having a CPU unit that is provided for processing a control program for controlling a technical process, wherein a power supply module of the automation system supplies electric energy to units that consume electric energy. During the control of the process, the energy consumption is optimized, such that the necessary automation functions for controlling the technical process are maintained.

8 Claims, 2 Drawing Sheets

(56) References Cited

OTHER PUBLICATIONS

Manson et al., "Automated power management systems for power consumers with on-site generation", Schweitzer Engineering Laboratories, Inc., pp. 1-10, Dec. 31, 2006, XP002603822 http://www.selinc.com/WorkArea/linkit.aspx?LinkIdentifier=id&ItemID=3414.

* cited by examiner

METHOD FOR OPERATING A MODULAR AUTOMATION DEVICE

CROSS-REFERENCE TO RELATED APPLICATIONS

This is a U.S. national stage of International Application No. PCT/EP2008/004503, filed on 5 Jun. 2008. The entire content of which application is incorporated herein by reference.

BACKGROUND OF THE INVENTION

1. Field of the Invention

The invention relates to a method for operating a modular automation device having a CPU that is provided for processing a control program for controlling a technical process, and a power supply module that supplies electrical energy to units that consume electrical energy. Additionally, the invention relates to an automation device having a CPU for processing a control program for controlling a technical process and having a power supply module which supplies electrical energy to units of the automation device that consume electrical energy. Furthermore, the invention relates to a code inspection program which is suitable for use in the automation device.

2. Description of the Related Art

Siemens Catalog ST 70, chapter 1, 2007 edition discloses a conventional method and automation device. This automation device comprises individual units, i.e., components or assemblies. Here, different systems can also be expanded during operation, so that units can be added, i.e., plugged into provided plug-in slots, without the entire system having to be switched off or powered down. Switching the system off would cause many problems, especially in the field of process automation and in particular in the field of plant control, since such downtimes naturally result directly in production stoppages. In order to be able to expand such a system, measures are provided which reduce or avoid the risk of overloads when adding units and/or an overdimensioning of the power supply for the system.

DE 10 2005 039 886 A1 discloses a modular system having a main module and a plurality of individual modules which can be connected thereto, as well as a power pack supplying the system with voltage. Each individual module is provided with at least one descriptor element, which encodes or reproduces a power requirement of the individual module that is not dependent on the actual operation of the respective individual module. The main module reads the descriptor elements of the connected individual modules, and in order to prevent a power pack overload, determines therefrom the overall power requirement of all connected units not dependent on the actual operation of the system. Measures to save energy, however, are not provided.

SUMMARY OF THE INVENTION

It is therefore an object of the present invention to provide an improved method for optimizing energy consumption in a modular system. Additionally, it is also an object to provide an automation device with improved energy consumption optimization. Furthermore, it is an object to provide a code inspection program that is suitable for such an automation device.

These and other objects and advantages are achieved in accordance with the invention by a method, an automation device and by a code inspection program in which an advantageous optimization of energy consumption is effected as part of the control operation, so that it is guaranteed that the necessary automation functions for controlling the technical process remain in place.

The energy consumption is continuously optimized as part of the control operation, during which several units can even be temporarily switched off, the maximum overall energy requirement does not need to be provided. Consequently, it is sufficient to configure the power supply module not for a maximum overall energy requirement, but only for an average overall energy requirement. An overdimensioned power supply module can therefore be dispensed with and costs can be saved. Additionally, power supply modules take up more space the higher their output.

In an embodiment of the invention, the time to effect an automation function or the time interval in activating this automation function is provided as a criterion. For example, no energy is fed to a sensor for particular time periods after transmission of a measured value recorded by the sensor, because further measured values are not needed during these periods or do not need to be analyzed. A further criterion can, for example, be the downtimes of an electric motor, during which no energy need be supplied to the motor. Furthermore, energy-related and automatically analyzable product data (product features) of the units, such as cooling losses of heaters or characteristic curves of motors, are suitable as criteria for optimally switching the energy supply on and off.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of an exemplary embodiment with reference to the drawings, which.

DETAILED DESCRIPTION OF THE PREFERRED EMBODIMENTS

Figure 1:
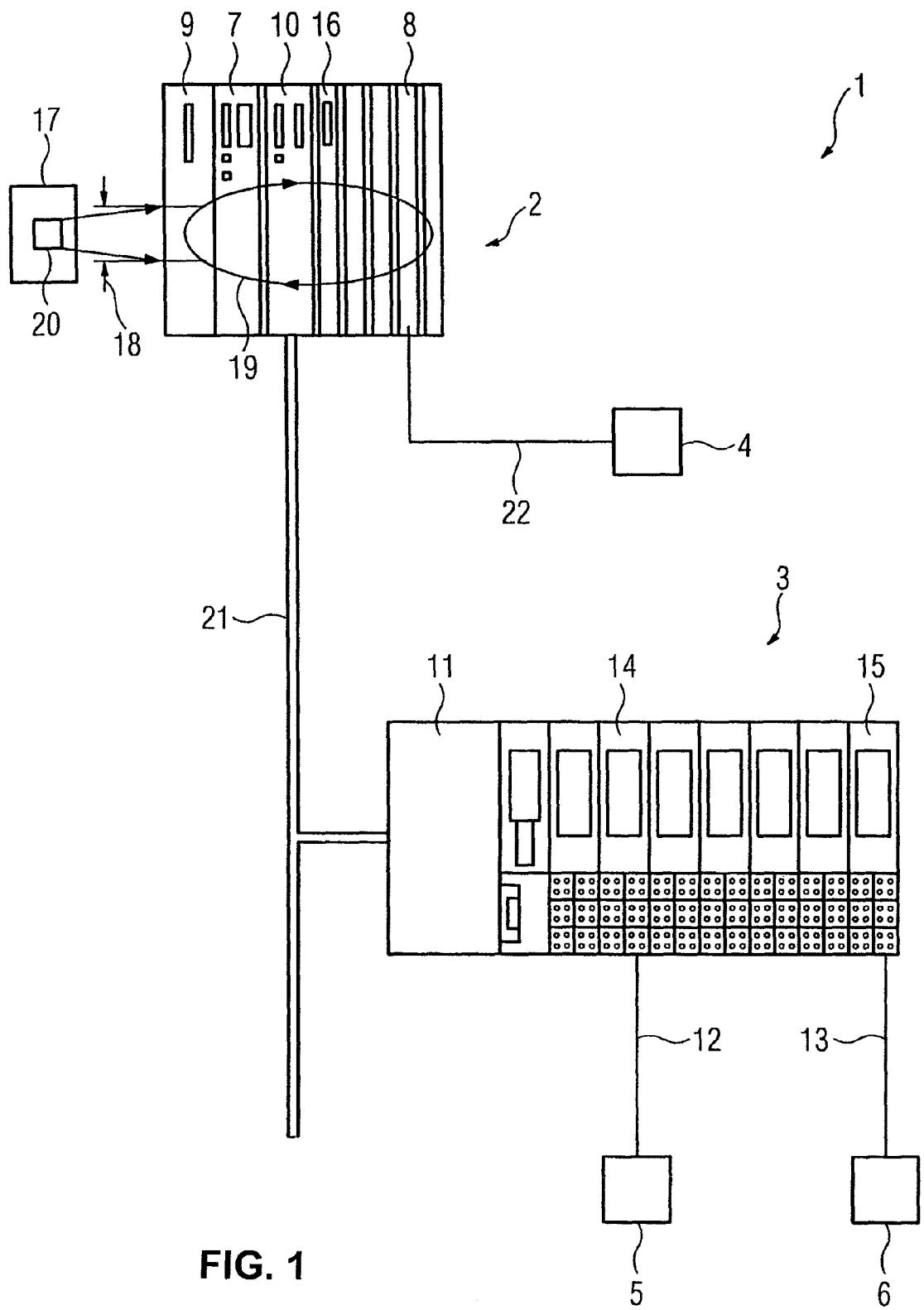
FIG. 1 shows component parts of an automation system in accordance with the invention.

With reference to FIG. 1 automation system 1, has an automation device 2 provided with a CPU assembly 7, a local peripheral device 3 and a plurality of field devices 4, 5, 6. The automation device 2 has further assemblies connected to the CPU assembly 7 through a backplane bus (not shown), e.g., assemblies in the form of a temperature regulator assembly 8, a power supply assembly 9, a master assembly 10 as well as further input/output and/or other function assemblies. The CPU assembly 7 of the automation device 2 cyclically processes a program for controlling a technical process. The automation system 1 can of course be provided with further automation devices and/or local peripheral devices depending on a control object to be achieved. Additionally, the automation system 1 can be connected, by a bus (not shown) to engineering systems, operating and monitoring systems, asset management systems and/or servers suitable for a process control system. The automation device 2 is connected to the local peripheral device 3 through the master assembly 10 and by a field bus 21 configured for high communication speeds, such as a field bus "PROFIBUS DP" which is known per se, where the local peripheral device 3 is likewise provided with a power supply assembly 11. Using further communication connections 12, 13 which are each suitable for process automation, the field devices 5, 6 are connected to modules 14, 15 of the local peripheral device 3.

In the following it is assumed that only three processes are to be controlled and that the field device 4 connected to the temperature regulator assembly 8 by a suitable communication connection 22 is a temperature sensor which records the temperature of a boiler, where the temperature regulator assembly 8 controls a separate power module (not shown) for supplying energy to the boiler. Additionally, it is assumed that the module 15 is a positioning assembly and the field device 5 a position sensor which records the position of a stepping motor, and that the module 15 is a digital input/output assembly and the field device 6 an image processing sensor for effecting color inspection tasks in installation engineering.

The power supply assembly 9 supplies the assemblies 7, 8, 10, 16 of the automation device 2 and the power supply assembly 11 supplies the assemblies 14, 15 of the local peripheral device 3 with electric energy, the power supply assemblies 9, 11 being configured in the present exemplary embodiment such that they also supply the respective field devices 4, 5, 6 with energy. At time intervals the field devices 4, 5, 6, the assemblies 7, 8 10, 14, 15 of the automation device 2 and of the local peripheral device 3 send their energy-related data to an analysis assembly 16 of the automation device 2. On the basis of this data and the knowledge of the processes to be controlled in respect of the temperature control of the boiler, the stepping motor controller and the image analysis, the analysis assembly 16 determines when, how long and in what cycles the processes must be controlled, how much energy is to be provided for these processes and whether it makes sense in energy terms to switch processes off completely for downtimes. It may, for example, make sense not to switch the heater for heating the boiler off completely because the energy requirement for heating a boiler that has cooled down significantly is higher than the energy that is required to keep the boiler at a low temperature during a "quiescent phase" and not to raise the temperature to the necessary operating temperature until required. In other words, the analysis assembly 16, the function of which the CPU assembly 7 can of course also take over, determines at time intervals or at predefinable times the current overall energy requirement of the automation system 1. The analysis assembly 16 has a code inspection program 17 which inserts instructions 20 during a time interval 18 of a cycle 19 of the control program based on the determined current overall energy requirement of the automation system 1. While processing this instruction in the following control program cycle, the CPU assembly 7 sends a control signal to the power supply assembly 9 of the automation device 2 over its backplane bus and to the power supply assembly 11 of the local peripheral device 3 over the bus 21, where the control signal displays the current overall energy requirement to these power supply assemblies 9, 11. Furthermore, the CPU assembly 7, by a suitable control signal, switches off the assemblies of the automation device 2 and/or the assemblies of the local peripheral device 3 which are no longer needed for controlling the processes, or switches them into an energy-saving mode. If, for example, it is no longer necessary to heat up the boiler and it can be switched off and furthermore the image processing sensor 6 is no longer required, the CPU assembly 7 sends the temperature regulator assembly 8 of the automation device 2 a control signal, on the basis of which the temperature regulator assembly 8 switches off the separate power module for supplying energy to the boiler and on the basis of this the temperature regulator assembly 8 switches itself off after the power module has been switched off. Furthermore, the CPU assembly 7 sends the digital input/output assembly 15 of the local peripheral device 3 a control signal to switch off the image processing sensor 6, whereby provision can also be made here for the digital input/output assembly 15 also to be switched off based on this control signal.

Figure 2:
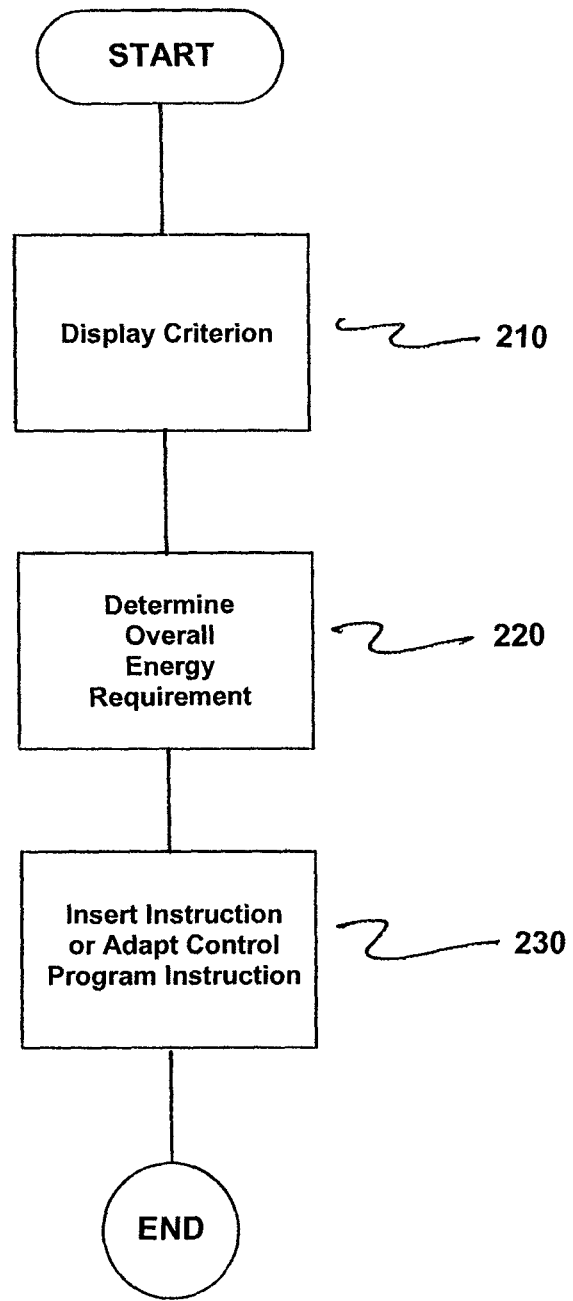
FIG. 2 is a flow chart of the method in accordance with an embodiment of the invention.

FIG. 2 is a flow chart of the method for operating an automation system having a CPU for processing a control program for controlling a technical process, and having a power supply module which supplies electrical energy to units which consume electrical energy. The method comprises displaying at least one criterion of a respective unit to an analysis unit, as indicated in step 210. Next, a current overall energy requirement based on the at least one criterion is determined by the analysis unit, as indicated in step 220.

Next, at least one program instruction representing the current overall energy requirement into the control program is automatically inserted by the analysis unit, or at least one program instruction of the control program is adapted, as indicated in step 230. Here, the electrical energy supply for the units is adjusted in accordance with the current overall energy requirement during the control operation based the inserted at least one program instruction or the adapted control program.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for operating an automation system having a CPU processing a control program to control a technical process of a production plant, and having a power supply module which supplies electrical energy to units which consume electrical energy, the method comprising:
   providing at least one criterion of a respective unit to an analysis unit;
   determining, by the analysis unit, a current overall energy requirement based on the provided at least one criterion;
   automatically inserting, by the analysis unit, at least one program instruction representing the current overall energy requirement into the control program, or adapting at least one program instruction of the control program, the electrical energy supply for the units being adjusted in accordance with the current overall energy requirement during the control operation based on one of the inserted at least one program instruction and the adapted control program instruction; and switching units which are no longer needed to control the technical process of the production plant into an energy-saving mode.

2. The method as claimed in claim 1, wherein the at least one criterion is at least one of a time required to effect an automation function and a time interval for activation of the automation function.

3. The method as claimed in claim 2, wherein the at least one criterion is interrogated at time intervals by the analysis unit.

4. The method as claimed in claim 1, wherein the at least one criterion is interrogated at time intervals by the analysis unit.

5. An automation system comprising a CPU processing a control program to control a technical process of a production plant, a power supply module which supplies electrical energy to units of the automation system that consume electrical energy, and an analysis unit,
   wherein the units provide at least one criterion to the analysis unit of the automation system;
   the analysis unit determines a current overall energy requirement based on the provided at least one criterion and at least one of inserts a program instruction representing a current overall energy requirement into the control program and adjusts an existing program instruction of the control program;
   wherein the CPU sends a signal to the power supply module, the power supply module adjusting the electrical energy supply for the units during a control operation in accordance with the current overall energy requirement based on the signal; and
   wherein the CPU switches units which are no longer needed to control the technical process of the production plant into an energy-saving mode.

6. The automation system as claimed in claim 5, wherein the at least one criterion is a time required to at least one of effect an automation function and a time interval for activation of the automation function.

7. The automation system as claimed in claim 6, wherein the analysis unit interrogates the at least one criterion at time intervals.

8. The automation system as claimed in claim 5, wherein the analysis unit interrogates the at least one criterion at time intervals.

* * * * *